Figure 1:
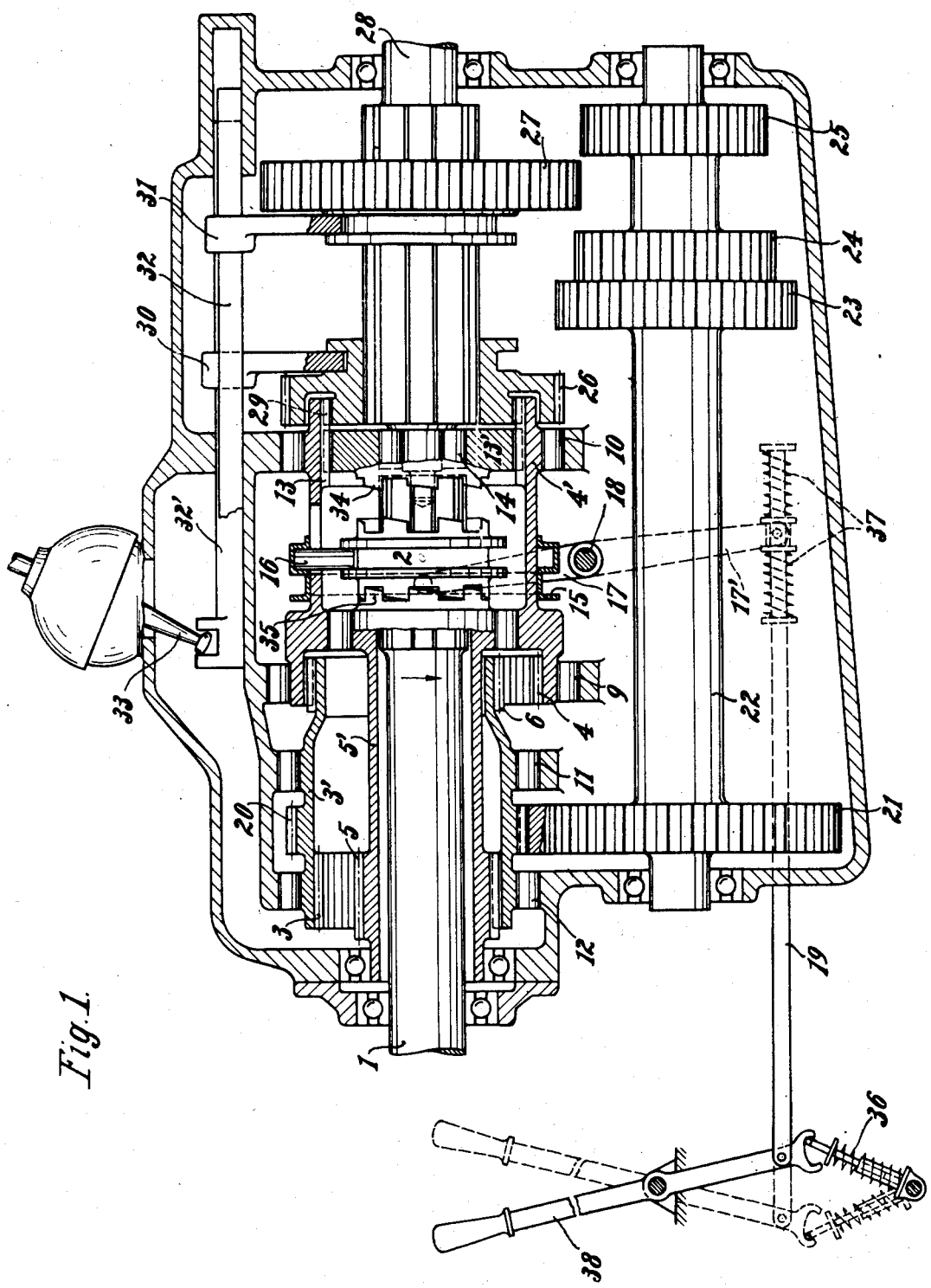

Inventor:
Karl Maybach

Dec. 12, 1933.  K. MAYBACH  1,939,508
CHANGE SPEED GEAR
Filed Aug. 7, 1931   2 Sheets-Sheet 2

Inventor:
Karl Maybach

Patented Dec. 12, 1933

1,939,508

UNITED STATES PATENT OFFICE 1,939,508

CHANGE SPEED GEAR

Karl Maybach, Friedrichshafen, Germany, assignor to Maybach-Motorenbau G. m. b. H., Friedrichshafen, Germany Application August 7, 1931, Serial No. 555,743, and in Germany August 21, 1930

1 Claim. (Cl. 74—57)

My invention relates to change speed gears, especially to gears of this kind which are used in automobiles.

For the purpose of attaining a most silent running, gears having internal teeth meshing with gears having external teeth are often provided. In such cases it is usual to have two pairs of constantly meshing gears of the kind described. Generally other spur gears are added for additional speed changes which may be performed by means of an auxiliary transmission shaft.

My invention improves change speed gears of this kind by providing a double clutch on the main shaft which is not provided with additional spur gears. This double clutch is adapted to alternately connect this main shaft with one or the other of the two pairs of gears which are constantly meshing and having one gear with internal teeth, each.

This construction according to my invention has the advantage of causing a very compact gear case, and furthermore it becomes possible to have six speed changes, for instance, with the same number of gears with internal teeth usual with a four speed change speed gear.

It is preferred to let the main shaft carrying the double clutch penetrate through the pairs of gears with internal teeth, and to provide the double clutch at its end.

Furthermore, it is advisable to provide a detachable connection in form of a coupling between the main shaft carrying the double clutch and the second main shaft carrying the additional spur gears, which may be shift gears.

I prefer to arrange one gear of one pair of the constantly meshing two pairs co-axial with one gear of the other pair thereof, one of these gears having external and the other having internal teeth.

External teeth may be provided on the tubular member connecting these two co-axial gears adapted to co-operate with a gear on the transmission shaft thus causing this shaft to rotate. In certain cases the gear having external teeth may serve directly for this purpose.

With the known change speed gears having gears with internal teeth and having a double clutch it is always necessary to provide an idling middle position for the clutch to allow for changes in the additional shift gears. This middle position is not necessary in the present construction according to my invention; the additional gears in my construction can be shifted while the double clutch is in one or the other of its two working positions. Therefore, it is possible to provide the double clutch with claw teeth with so inclined front faces that the approaching coupling halves do not engage but rattle past each other so long until their relative direction of rotation has changed, which means that the originally slower half has become the faster one or vice versa.

Thus it is possible to change between the two constantly meshing gear pairs without being obliged to operate the main friction clutch which is provided in every automobile and which generally is de-clutched for the purpose of performing a change speed.

Having given a general description of my invention I now want to point it out more in detail having reference to the drawings which represent an example embodying my invention.

Figure 2:
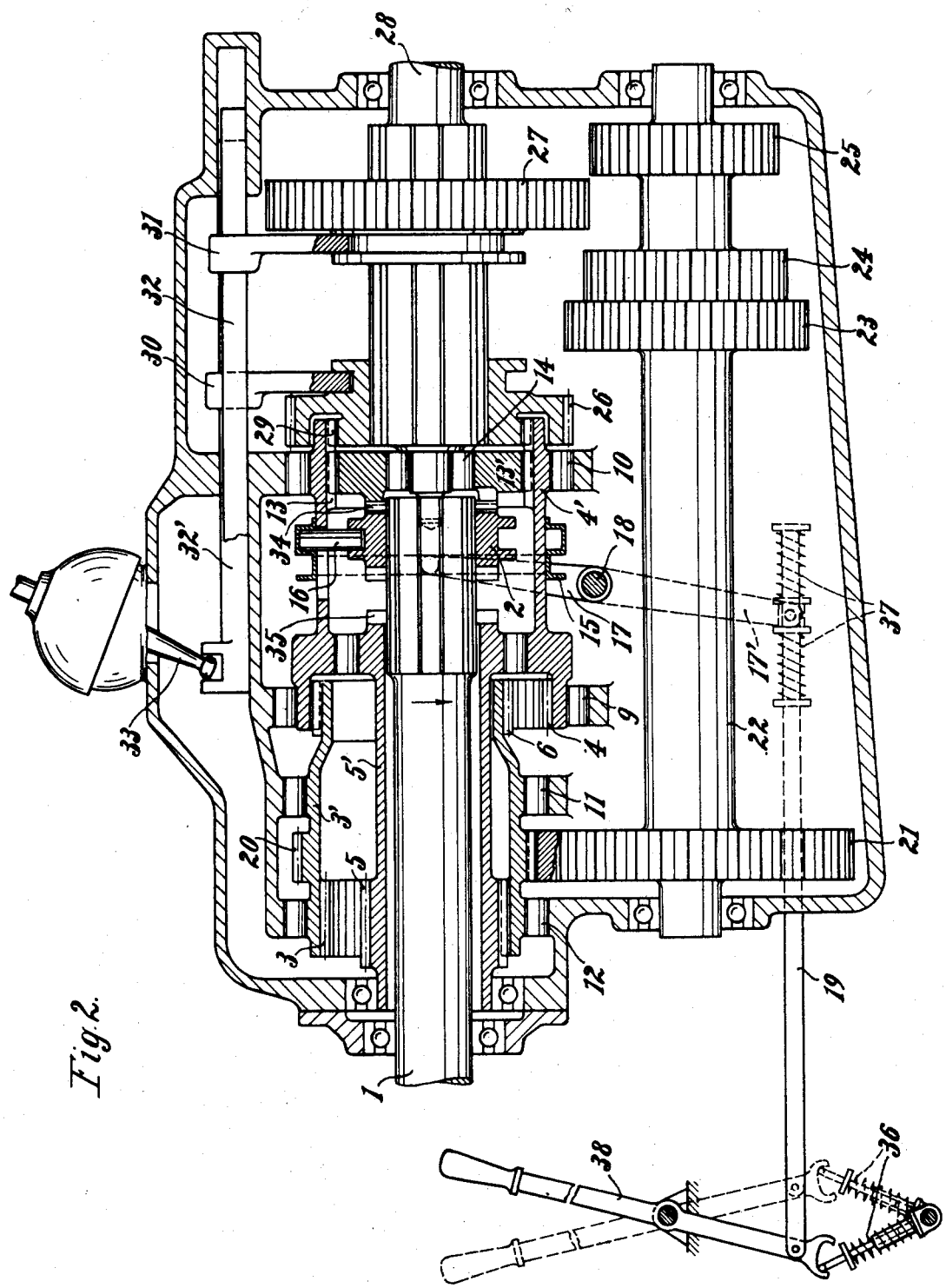

Both figures are longitudinal vertical sections through the gear case, Fig. 1 giving one position of the double clutch and Fig. 2 showing its other position. In Fig. 1 the double clutch is shown in side elevation, whereas in Fig. 2 it is given in section.

Splined to incoming shaft 1 is double clutch member 2 forming a sleeve and being provided with teeth adapted to co-operate alternately with claw teeth 34 or with claw teeth 35. Teeth 34 belong to the ring member 13' which is journaled at 14 and which is in rotatable connection with sleeve 4' and gear 4. This latter gear has internal teeth meshing with gear 6. Sleeve 4' and gear 4 are journaled at 9 and 10. Gear 6 and gear 3 with internal teeth are formed integral with sleeve 3'. They are journaled at 11 and at 12.

Teeth 35 belong to sleeve 5' and to gear 5 which meshes with gear 3.

Sleeve 4' at its right hand end is provided with internal coupling teeth 13 adapted to co-operate with external teeth 29 of gear 26 which is splined to outgoing shaft 28.

There is a ring 15 adapted to slide on sleeve 4', and a bolt or similar member 16 with one of its ends fits into a circular groove of ring 15 and with its other end into a circular groove of sleeve 2. Lever 17 serves for shifting ring 15 on sleeve 4' thus causing sleeve 2 to be shifted on shaft 1. Lever 17 is journaled at 18 and its arm 17' is moved by means of rod 19. A snap mechanism 36 prevents sleeve 2 from taking an idling middle position; it tensions member 2 alternately to the right or to the left.

Sleeve 3' has external teeth 20 meshing with gear 21 fixed to transmission shaft 22. There are other gears 23, 24 and 25 rigidly fixed to shaft 22 and adapted to co-operate with gears 26 and 27, respectively. Gear 26 can be shifted into three positions; one being shown in the figures, in which it serves as coupling member between sleeve 4' and shaft 28; the second position is its idling position when shifted to the right before engagement with gear 23 is effected; and its third position is engagement with gear 23, thus effecting another speed. Gear 27 also has three positions; one being its idling position represented in the drawings; the second being its engagement with gear 24 causing another speed; and the third being its engagement with an intermediate reversing gear, not represented, and adapted to cooperate with gear 25, thus causing the reverse speed. Gears 26 and 27 are shifted by means of levers 30 and 31, respectively, striker rods 32 and 32', respectively, and lever 33.

In the position represented in Fig. 1 shaft 1 drives sleeve 2 which is connected to sleeve 5'; gear 5 drives gear 3, sleeve 3' and gear 6; which again drives gear 4, sleeve 4' and gear 26 splined to shaft 28.

If sleeve 2 is left in this position two other forward speeds may be set by adequately shifting gears 26 and 27 to mesh with gears 23 and 24, respectively. One gear train in this case is: shaft 1, sleeve 2, sleeve 5', gear 5, gear 3, gear 20, gear 21, shaft 22, gear 23, gear 26, shaft 28. The other gear train is: shaft 1, sleeve 2, sleeve 5', gear 5, gear 3, gear 20, gear 21, shaft 22, gear 24, gear 27, shaft 28.

In Fig. 2 coupling sleeve 2 is moved to its right hand position and there is driving connection from shaft 1 over member 13', sleeve 4' and gear 26 by means of coupling 13/29 to driven shaft 28, which means that both shafts are directly coupled.

In this position of sleeve 2 two other speeds are possible by shifting gears 26 and 27, respectively, to come into engagement with gears 23 and 24, respectively. In the first case the transmitting members are: shaft 1, member 13', sleeve 4', gear 4, gear 6, sleeve 3', gear 20, shaft 22, gear 23, gear 26, shaft 28. In the second case the same members are made use of, except that instead of gears 23, 26, gears 24, 27 are substituted.

The main advantages are, that with the two pairs of constantly meshing gears each having one gear with internal teeth and one gear with external teeth it is possible to have 6 forward speeds with only two additional gear pairs, and that there are three speeds from each of which you can change to one other speed without touching the main friction clutch (not represented).

This latter advantage comes from the inclination of the front faces of the teeth 34 and 35 and the corresponding teeth on clutch member 2. The inclination is such that when member 2 moves from one of its two positions into its other position the teeth do not engage but are merely tensioned towards each other by means of one of the springs 37. Final engagement of the teeth is performed only after their relative direction of rotation has changed, so that the originally faster rotating coupling member has become the slower rotating one or vice versa. Likewise dis-engagement is not effected directly by operating the operating lever 38; this operation simply tensions one of the springs 37, and the teeth under load do not dis-engage until gas is taken off the motor so that they are unloaded, then the tensioned spring causes dis-engagement and shifting of sleeve member 2 to its other position, in which the other teeth rattle past each other, as described above.

Arrangements of this kind are not new per se but are, for instance, explained in detail in my U. S. Patent No. R. 17,707.

I do not want to be limited to the details described or shown in the drawings as many variations will occur to those skilled in the art.

What I claim is:

A change speed gear comprising two main shafts, a driving and a driven one, forming a main shaft train; two pairs of constantly meshing transmission gears and additional gears in said main shaft train; said constantly meshing pairs each having one gear with external teeth and one gear with internal teeth; a sleeve connecting the internal gear of one pair with the external gear of the other pair; an additional external gear on said sleeve; a double claw sleeve splined to one of said main shafts, means for shifting said sleeve into either of its two end positions, one of these end positions being driving connection with one of said constantly meshing gear pairs, and the other end position being driving connection with the other one of said constantly meshing gear pairs; a counter shaft with a plurality of transmission gears thereon, one of said gears being fixed to said countershaft and being in mesh with said additional gear on said sleeve connecting said internal and said external gears; and means for alternately bringing into and out of engagement said other gears on said countershaft with said additional gears in said main shaft train, respectively.

KARL MAYBACH.